United States Patent
Moloney et al.

(10) Patent No.: US 10,851,299 B2
(45) Date of Patent: Dec. 1, 2020

(54) CORROSION INHIBITOR COMPOSITIONS AND METHODS OF USING SAME

(71) Applicant: ChampionX USA Inc., Sugar Land, TX (US)

(72) Inventors: Jeremy Moloney, Katy, TX (US); Prakasa Rao Anantaneni, Richmond, TX (US)

(73) Assignee: ChampionX USA Inc., Sugar Land, TX (US)

( * ) Notice: Subject to any disclaimer, the term of this patent is extended or adjusted under 35 U.S.C. 154(b) by 160 days.

(21) Appl. No.: 16/174,995

(22) Filed: Oct. 30, 2018

(65) Prior Publication Data

US 2019/0127639 A1    May 2, 2019

Related U.S. Application Data

(60) Provisional application No. 62/580,048, filed on Nov. 1, 2017.

(51) Int. Cl.
    *C09K 15/12*     (2006.01)
    *C23F 11/16*     (2006.01)
    *C09K 8/54*      (2006.01)

(52) U.S. Cl.
    CPC ........... *C09K 15/12* (2013.01); *C09K 8/54* (2013.01); *C23F 11/16* (2013.01); *C23F 11/161* (2013.01);
    (Continued)

(58) Field of Classification Search
    CPC ...... C09K 15/12; C09K 8/54; C09K 2208/20; C09K 2208/32; C23F 11/161; C23F 11/16
    See application file for complete search history.

(56) References Cited

U.S. PATENT DOCUMENTS 2,477,327 A * 7/1949 Blake .................. C07C 323/00
                                                            560/154
2,610,202 A * 9/1952 Milton ................. C08G 75/26
                                                            560/154
(Continued)

FOREIGN PATENT DOCUMENTS

CN      107021890 A      8/2017
JP      58224349 A  * 12/1983  ............. G03C 1/346
(Continued)

OTHER PUBLICATIONS

Reactions Involving Maleic Anhydride Based Materials pp. 59-149 Springerlink Online Sep. 23, 2016 (Year: 2016).*

(Continued)

*Primary Examiner* — Pamela H Weiss
(74) *Attorney, Agent, or Firm* — Kagan Binder, PLLC

(57) ABSTRACT

Disclosed herein are sulfur-functional corrosion inhibitors that are adducts of a cyclic anhydride with 2-mercaptoethanol. Concentrates of the sulfur-functional corrosion inhibitors do not degrade to form $H_2S$ under standard storage conditions for a period of up to 5 years. Also disclosed herein are treated water sources and treated metal containments including one or more sulfur-functional corrosion inhibitors. The sulfur-functional corrosion inhibitors inhibit corrosion of metal containments contacted with one or more water sources, wherein the one or more water sources comprise one or more corrodents. The sulfur-functional corrosion inhibitors are as effective or more effective at inhibiting corrosion than conventional sulfur-based corrosion inhibitors when compared on a weight or a volume basis.

15 Claims, 1 Drawing Sheet

(52) U.S. Cl.
    CPC ...... *C09K 2208/20* (2013.01); *C09K 2208/32* (2013.01)

(56) References Cited

U.S. PATENT DOCUMENTS

| | | | |
|---|---|---|---|
| 3,422,166 A | 1/1969 | Davis | |
| 3,650,978 A | 3/1972 | Chambers et al. | |
| 3,920,700 A * | 11/1975 | Hayashi | C08G 63/688 |
| | | | 549/11 |
| 4,411,808 A * | 10/1983 | Gutierrez | C10M 135/26 |
| | | | 252/78.1 |
| 6,063,334 A | 5/2000 | Naraghi | |
| 6,200,947 B1 * | 3/2001 | Takashima | C11D 7/06 |
| | | | 134/2 |
| 2014/0076567 A1 | 3/2014 | Meyer et al. | |

FOREIGN PATENT DOCUMENTS

| | | |
|---|---|---|
| JP | 5934531 A | 2/1984 |
| WO | 01/12878 A1 | 2/2001 |
| WO | 2009/006527 A1 | 1/2009 |
| WO | 2009/097562 A1 | 8/2009 |

OTHER PUBLICATIONS

Zienty et al., "Base-Catalyzed Addition of Thiols to a,B—Unsaturated Anhydrides", Journal of Organic Chemistry, vol. 27 (9), 1962, pp. 3140-3146.
International Search Report for International Application No. PCT/US2018/058181, dated Jan. 28, 2019, 8 pages.
Written Opinion for International Application No. PCT/US2018/058181, dated Jan. 28, 2019, 10 pages.

* cited by examiner

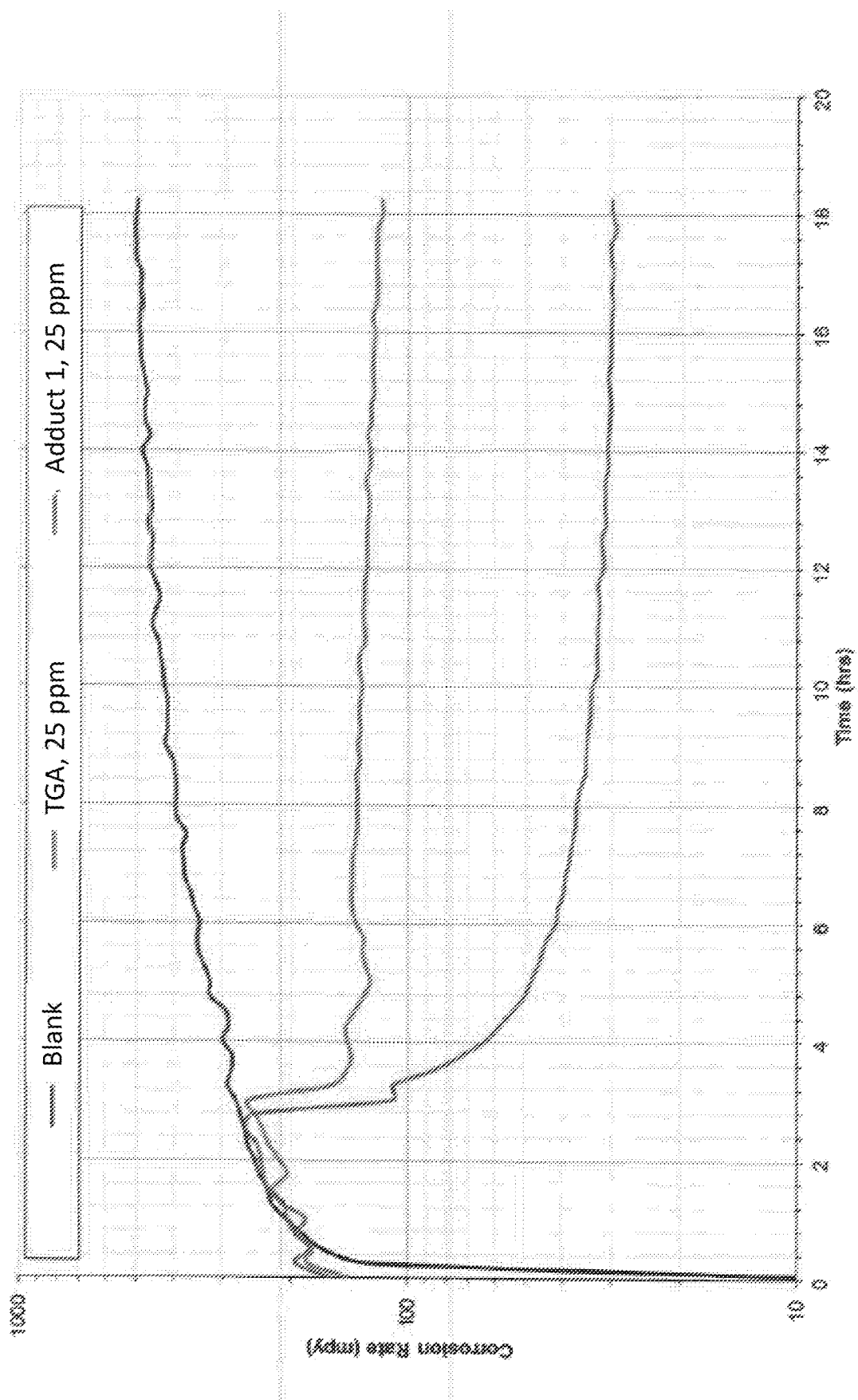

CORROSION INHIBITOR COMPOSITIONS AND METHODS OF USING SAME

FIELD OF THE INVENTION

The present invention generally relates to methods and compositions for improved corrosion inhibition of metal surfaces exposed to one or more corrodents present in water sources.

BACKGROUND

Aqueous liquids are injected into the earth and/or recovered from the earth during subterranean hydrocarbon recovery processes such as hydraulic fracturing (fracking) and tertiary oil recovery. In one or more such processes, an aqueous liquid called an "injectate" is injected into a subterranean formation. Injectates include water and entrained solids and/or solvents therein. In one or more such processes a water source called "produced water" is recovered, i.e. flows back from the subterranean formation and is collected along with a hydrocarbon product. Produced water includes one or more of injectate, connate (native water present in the subterranean formation along with the hydrocarbon), sea water, and hydrocarbon liquids or solids entrained (dispersed, emulsified, or dissolved) therein. In some embodiments, one or more of the injectate and the produced water includes one or more corrodents such as salts and/or other dissolved solids, liquids, or gases that cause, accelerate, or promote corrosion of metal containments such as metal pipelines used to transport the produced water toward, into, out of, or away from a subterranean formation, metal tanks used to hold the water sources for a period of time, and/or other metal equipment or devices that contact the water sources before, during, or after injection or production. Non-limiting examples of such corrodents are carbon dioxide, oxygen, sodium chloride, calcium chloride, and sulfur dioxide.

Almost all operators in the oil and gas extraction and processing industry employ corrosion inhibitors to reduce internal corrosion in metal containments which are contacted by aqueous liquids containing corrodents. Corrosion inhibitors are added to the liquids and dissolved gasses which come into contact with metal surfaces where they act to prevent, retard, delay, reverse, and/or otherwise inhibit the corrosion of metal surfaces such as carbon steel metal surfaces. In some cases one or more corrosion inhibitors are added to a water source, such as an injectate and/or a produced water; optionally, other additives such as polymers, surfactants, scale inhibitors, paraffin inhibitors, metal complexing agents, and the like are added along with the corrosion inhibitor or are present in the water source to which the corrosion inhibitor is applied. Such corrosion inhibitors are beneficial in that they permit the use of carbon steel components rather than the much more expensive high nickel, cobalt, and chromium alloys or other materials either more expensive than carbon steel and/or which inherently entail other disadvantages in suitability for the purpose of liquid containment.

One useful class of corrosion inhibitors commonly employed in water sources arising from oil recovery processes are sulfur-based corrosion inhibitors. Conventional sulfur-based corrosion inhibitors include, for example, thioglycolic acid, 2-mercaptoethanol, and sodium thiosulfate. Sulfur-based corrosion inhibitors are known to be highly effective corrosion inhibitors and are favored in the industry because they are also inexpensive. However, some sulfur-based corrosion inhibitors are known to produce hydrogen sulfide ($H_2S$) gas when stored in an enclosed space for periods of time as short as 24 hours or even less at ambient temperatures such as about 20° C. This problem is exacerbated by storage of sulfur-based corrosion inhibitor concentrates, which may include up to 90 wt % of one or more sulfur-based corrosion inhibitors in a solution or dispersion. Conventional storage methods employed for these concentrates lead to substantial amounts of $H_2S$ gas buildup in the headspace of the containers holding such concentrates: in some embodiments, as much as 1000 ppm to 10,000 ppm $H_2S$ gas accumulates in the headspace of storage containers holding a sulfur-based corrosion inhibitor concentrate.

Hydrogen sulfide itself is a known corrodent recognized to cause severe corrosion issues in metal containments related to oil recovery operations. Hydrogen sulfide is toxic and dissolves in both hydrocarbon (oil/gasoline) and water streams. Further, where $H_2S$ is dissolved in such liquid streams it is also present as a flammable gas over the liquid streams, providing a severe health and safety risk.

The industry has recognized the hazards associated with $H_2S$ and has responded by development of $H_2S$ scavengers, which do not prevent degradation of sulfur-based corrosion inhibitors but rather adsorb or react with $H_2S$ to remove (scavenge) it from the systems where it becomes entrained. For example, triazines are known $H_2S$ scavengers. The scavenger approach is effective for eliminating naturally arising sources of $H_2S$, such as in natural gas, produced water, and the like. However, once a sulfur-based corrosion inhibitor is chemically degraded to release $H_2S$, the residue of the degraded sulfur-based corrosion inhibitor is no longer effective for its intended purpose.

Consequently, there is a need in the industry to prevent accumulation of $H_2S$ gas during storage of sulfur-based corrosion inhibitors and compositions containing sulfur-based corrosion inhibitors. There is a need in the industry for stabilized sulfur-based corrosion inhibitor compositions. And there is a need in the industry to improve the corrosion inhibition efficacy of such treatments beyond that of industry-standard sulfur-based corrosion inhibitor compositions.

BRIEF DESCRIPTION OF THE DRAWINGS

FIG. 1 is a plot of corrosion in milli-inches per year as a function of time for a composition described herein.

SUMMARY OF THE INVENTION

Disclosed herein are compositions including sulfur-functional corrosion inhibitors ("2ME Adducts" or "2ME Adduct compositions" herein) according to formula I, formula II, or a combination of two or more thereof:

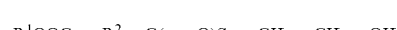

I

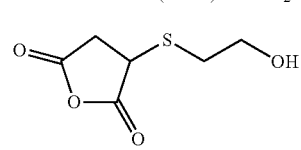

II wherein $R^1$ is hydrogen, sodium, lithium, potassium, or an ammonium; and $R^2$ is CH=CH, $CH_2$—$CH_2$, or CH(S—$CH_2$—$CH_2$—OH)$CH_2$. In embodiments the 2ME Adduct composition comprises or consists essentially of a mixture of two or more structures having formula I, further wherein the compound of formula II is excluded or substantially excluded. In embodiments the 2ME Adduct composition comprises or consists essentially of a mixture of a compound of formula I with the compound of formula II. In some embodiments the 2ME Adduct composition comprises or consists essentially of the compound of formula II, wherein compounds of formula I are excluded or substantially excluded.

The 2ME Adducts are formed by the reaction of 2-mercaptoethanol with maleic anhydride or with succinic anhydride. In embodiments the reaction comprises, consists essentially of, or consists of acylation of 2-mercaptoethanol with maleic anhydride or succinic anhydride. In embodiments the reaction is acylation by maleic anhydride and 1,2-addition of 2-mercaptoethanol to the residual unsaturated moiety of the maleic anhydride. In embodiments the reaction is 1,2-addition of 2-mercaptoethanol to the residual unsaturated moiety of the maleic anhydride to result in formula II. Blends of two or more of the 2ME Adduct compounds are also contemplated. One or more 2ME Adducts are suitably applied to a water source comprising a corrodent to form a treated water source. The treated water source is contacted with a surface of a metal containment, wherein corrosion of the metal surface by the one or more corrodents is inhibited.

The 2ME Adducts inhibit corrosion of metal containments contacted with one or more water sources wherein the one or more water sources comprise one or more corrodents. In embodiments, when compared on a weight basis, the 2ME Adducts are as effective or more effective than conventional sulfur-based corrosion inhibitors at inhibiting corrosion of metal surfaces contacted with a water source. In embodiments, a 2ME Adduct composition includes at least one 2ME Adduct of formulae I and/or II and at least one solvent. The 2ME Adduct compositions are storage stable as they do not result in $H_2S$ formation under standard storage conditions.

In embodiments, the 2ME Adduct compositions are 2ME Adduct concentrates. A 2ME Adduct concentrate includes about 1 wt % to 90 wt % of one or more 2ME Adduct, and one or more solvents. In some embodiments the one or more solvents are the balance of the concentrate, that is, 10 wt % to 99 wt % of the 2ME Adduct concentrate. Optionally, the concentrate further includes one or more polymers, surfactants, or combinations of two or more thereof. In some embodiments the 2ME Adduct concentrates include about 5 wt % to 25 wt % of one or more 2ME Adducts. The 2ME Adduct concentrates are stable under standard storage conditions for at least two days and up to five years. Additionally, during storage of the 2ME Adduct concentrates under standard storage conditions for at least two years, $H_2S$ is not measurably released, as determined by storing the 2ME Adduct concentrates in containers under standard storage conditions, followed by headspace analysis of the storage containers for $H_2S$.

Also disclosed herein is a method of storing a 2ME Adduct composition, the method comprising combining 1 wt % to 90 wt % of one or more 2ME Adducts of formulae I and/or II with one or more solvents, and optionally further with one or more polymers, surfactants, or combinations of two or more thereof to form a 2ME Adduct concentrate; and storing the 2ME Adduct concentrate in an enclosed container for at least 24 hours and as long as five years. In some embodiments the 2ME Adduct concentrates include about 5 wt % to 25 wt % of one or more 2ME Adducts of formulae I and/or II. In some embodiments the storage is between −40° C. and 70° C. During storage of the 2ME Adduct concentrates, $H_2S$ is not measurably released, as determined by headspace analysis of the storage containers.

Also disclosed herein is a method of treating a water source comprising one or more corrodents, the method comprising or consisting essentially of applying about 0.5 ppm to 500 ppm by weight or by volume of one or more 2ME Adducts of formulae I and/or II to the water source to form a treated water source. The untreated water source has one or more corrodents dissolved or dispersed therein. Also disclosed herein is a method of treating a metal containment, the method comprising or consisting essentially of forming a treated water source; and applying the treated water source to the metal containment. The metal containment is a tank, pipe, or other apparatus having a metal surface in contact with a water source, wherein the water source includes one or more corrodents. In embodiments the one or more corrodents include one or more of hydrogen sulfide, carbon dioxide, oxygen, sodium chloride, calcium chloride, and sulfur dioxide. In embodiments the method includes forming a 2ME Adduct concentrate, then combining the concentrate with the water source. In some such embodiments, the method further includes storing the 2ME Adduct concentrate under standard storage conditions for between 24 hours and five years prior to the adding.

Also disclosed herein are treated water sources and treated metal containments including one or more 2ME Adducts. A treated containment is a metal containment comprising a treated water source contacting a metal surface or portion thereof. A treated water source comprises water, one or more corrodents, and about 0.5 ppm to 500 ppm (by weight or volume) of one or more 2ME Adducts of formula I. In embodiments, the water source is an industrial water source, such as a produced water or waste water from an industrial process. In embodiments the one or more corrodents include $H_2S$. In embodiments, the containment surface in contact with the water source or the treated water source includes a carbon steel surface. In embodiments, the carbon steel surface is a stainless steel surface. In embodiments, the water source is a continuously flowing water source, such as produced water flowing from a subterranean reservoir and into or through a pipe or tank, or wastewater isolated from a continuous manufacturing process flowing into a wastewater treatment apparatus. In other embodiments, the water source is a batch, or plug, substantially disposed in a batchwise or static state within the containment.

DETAILED DESCRIPTION

Although the present disclosure provides references to preferred embodiments, persons skilled in the art will recognize that changes may be made in form and detail without departing from the spirit and scope of the invention. Reference to various embodiments does not limit the scope of the claims attached hereto. Additionally, any examples set forth in this specification are not intended to be limiting and merely set forth some of the many possible embodiments for the appended claims.

Definitions

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

As used herein, the term "water source" means a liquid comprising water and one or more corrodents. In embodiments, the water source comprises, consists essentially of, or consists of wastewater from one or more industrial processes. In embodiments, the water source comprises, consists essentially of, or consists of produced water. In embodiments, the amount of the one or more corrodents in the water source is sufficient to corrode a carbon steel at a rate of at least 100 milli-inches per year, and in embodiments as much as 1000 milli-inches per year.

As used herein, the term "produced water" means a water source that flows from a subterranean formation in a hydrocarbon recovery process such as hydraulic fracturing or tertiary oil recovery, further wherein the water source includes one or more hydrocarbons, one or more dissolved solids, or a combination thereof.

As used herein, the term "corrodent" means salts and/or other dissolved solids, liquids, or gasses that cause, accelerate, or promote corrosion, further wherein the corrodent is dissolved or dispersed in a water source. Non-limiting examples of corrodents are hydrogen sulfide, hydrogen chloride, carbon dioxide, oxygen, sodium chloride, calcium chloride, and/or sulfur dioxide.

As used herein, the term "container" means a discrete article having an interior volume and means to enclose a liquid therein, wherein "enclose" means substantially isolate the liquid from the ambient atmosphere and from fluid communication. Means to enclose include one or more of caps, valves, lids, covers, plugs, stoppers, doors, or other conventional means known to those of skill to enable enclosing a liquid within the interior volume. In embodiments, the interior volume of the container enclosing a liquid further includes a headspace volume comprising a gas.

As used herein, the term "storage conditions" generally refers to the conditions surrounding or proximal to a container and that affect the temperature and/or pressure of the enclosed contents of the container. Such conditions include ambient temperature and pressure, contact of the exterior container with direct sunlight, and the like. In embodiments the storage conditions cause temperature and pressure within the container to vary during a storage period, wherein the storage period is 24 hours to five years.

As used herein, the term "standard storage conditions" means storage conditions wherein the temperature proximal to the container or within the container is between −40° C. and 70° C.

As used herein, the term "stable" or "storage stable" means that after at least 24 hours of storage under standard storage conditions, no $H_2S$ is measured in the headspace of a container having a material or composition enclosed therein.

As used herein, the term "containment" or "metal containment" means an apparatus having a metal surface or portion thereof that is in contact with a water source, or potentially in contact with a water source, or intended for contact with a water source. In embodiments the containment is in fluid communication with one or more devices or apparatuses, including other containments. In embodiments the containment is a pipe. In embodiments the containment is a tank. In embodiments the metal is steel. In embodiments, the steel is a carbon steel; in some such embodiments the steel is stainless steel.

The terms "comprise(s)", "include(s)", "having", "has", "can", "contain(s)", and variants thereof, as used herein, are intended to be open-ended transitional phrases, terms, or words that do not preclude the possibility of additional acts or structures. The singular forms "a", "and", and "the" include plural references unless the context clearly dictates otherwise. The present disclosure also contemplates other embodiments "comprising", "consisting of" and "consisting essentially of", the embodiments or elements presented herein, whether explicitly set forth or not.

As used herein, the term "optional" or "optionally" means that the subsequently described component, event or circumstance may but need not be present or occur. The description therefore discloses and includes instances in which the event or circumstance occurs and instances in which it does not, or instances in which the described component is present and instances in which it is not.

As used herein, the term "about" modifying, for example, the quantity of an ingredient in a composition, concentration, volume, temperature, time, yield, flow rate, pressure, and like values, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, through standard operating machine error, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents according to this definition. Further, where "about" is employed to describe a range of values, for example "about 1 to 5" the recitation means "1 to 5" and "about 1 to about 5" and "1 to about 5" and "about 1 to 5" unless specifically limited by context.

As used herein, the term "substantially" means "consisting essentially of", as that term is construed in U.S. patent law, and includes "consisting of" as that term is construed in U.S. patent law. For example, a solution that is "substantially free" of a specified compound or material may be free of that compound or material, or may have a minor amount of that compound or material present, such as through unintended contamination or incomplete purification. A "minor amount" may be a trace, an unmeasurable amount, an amount that does not interfere with a value or property, or some other amount as provided in context. A composition that has "substantially only" attached to a provided list of components may consist of only those components, or have a trace amount of some other component present, or have one or more additional components that do not materially affect the properties of the composition. Additionally, "substantially" modifying, for example, the type or quantity of an ingredient in a composition, a property, a measurable quantity, a method, a value, or a range, employed in describing the embodiments of the disclosure, refers to a variation that does not affect the overall recited composition, property, quantity, method, value, or range thereof in a manner that negates an intended composition, property, quantity, method, value, or range. Where modified by the term "substantially" the claims appended hereto include equivalents according to this definition.

Discussion

Disclosed herein are sulfur functional corrosion inhibitors having formula I:

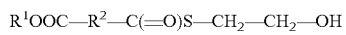  I wherein $R^1$ is hydrogen, sodium, lithium, potassium, or an ammonium group; and $R^2$ is CH=CH, $CH_2$—$CH_2$, or $CH_2$—CH(S—$CH_2$—$CH_2$—OH). Also disclosed herein are blends of two or more compounds of formula I. Also disclosed herein is a sulfur functional corrosion inhibitor based on the 1,2-addition ("Michael addition") product of 2-mercaptoethanol with maleic anhydride, which is 3-(2-hydroxy-ethylsulfanyl)-dihydro-furan-2,5-dione as represented by formula II.

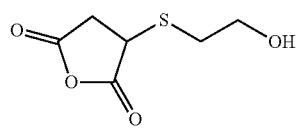  II

Also disclosed herein are blends of 3-(2-hydroxy-ethylsulfanyl)-dihydro-furan-2,5-dione with one or more compounds of formula I. Collectively, compounds of formulae I and/or II are referred to herein as "2ME Adducts".

The 2ME Adducts are products of the reaction of 2-mercaptoethanol (2ME) with an anhydride, which is selected from maleic anhydride and succinic anhydride. In embodiments the 2ME Adducts are formed by the reaction of 2-mercaptoethanol (2ME) with maleic anhydride to result in a compound of formula I, formula II, or a combination thereof. In embodiments the 2ME Adducts are formed by the reaction of 2-mercaptoethanol with succinic anhydride to result in a compound of formula I, further wherein $R^2$ is $CH_2$—$CH_2$. In embodiments, one mole of maleic anhydride reacts with two moles of 2-mercaptoethanol to form a 2ME Adduct. In embodiments, one mole of maleic anhydride reacts with one mole of 2-mercaptoethanol to form a 2ME Adduct. In embodiments, one mole of succinic anhydride reacts with one mole of 2-mercaptoethanol to form a 2ME Adduct. In some embodiments the reaction comprises, consists essentially of, or consists of an acylation. In embodiments the reaction comprises both acylation and 1,2-addition of 2-mercaptoethanol to the residual unsaturated moiety of the maleic anhydride. In embodiments the reaction comprises, consists essentially of, or consists of 1,2-addition of 2-mercaptoethanol to the residual unsaturated moiety of the maleic anhydride.

The reaction is carried out by contacting the components, that is, by contacting 2-mercaptoethanol with succinic anhydride or maleic anhydride. In embodiments, a 1:1 molar ratio of 2-mercaptoethanol to succinic anhydride is contacted to form the 2ME Adduct, although the molar ratio may be suitably varied between about 1.5:1 to 1:1.5, or 1.4:1 to 1:1.4, or 1.3:1 to 1:1.3, or 1.2:1 to 1:1.2 or 1.1:1 to 1:1.1. In embodiments, the molar ratio of 2-mercaptoethanol to maleic anhydride contacted to form the 2ME Adduct is about 1:1 to 2.5:1, or about 1:1 to 2:1, or about 1:1 to 1.5:1. The contacting is continued until the reaction is substantially complete. In embodiments the contacted components are heated. In some embodiments the combination of contacted components further includes one or more solvents. However, it is an advantage of the present method that no solvent is required to conduct the reaction and the reaction may be completed "neat", that is, substantially excluding solvents or excluding solvents. Suitable solvents that are optionally included in the reaction mixture to form one or more 2ME Adducts include water and water miscible solvents including $C_1$-$C_6$ alkanols, alkoxyalkanols, glycols, glycol ethers, glycol esters, and mixtures of two or more such solvents in any ratio.

In embodiments, the heating is heating to a temperature sufficient to melt one or more of the contacted components. In embodiments, the heating is heating to a temperature of about 60° C. to 150° C., or about 60° C. to 120° C., or about 60° C. to 100° C. In some embodiments, the heating is continued for a period of about 1 minute to about 12 hours, or about 10 minutes to 10 hours, or about 30 minutes to 5 hours. In embodiments the heating is continued until one or more compounds of formula I are detected, or until the reaction between the components is sufficient to provide optimal anti-corrosion activity of the resulting 2ME Adduct, as determined by the operator and further by optimization of reaction products for one or more specific containments, specific corrodents, specific water sources, or a combination thereof.

Detecting the extent of the reaction and/or verifying the formation of a 2ME Adduct of formulae I and/or II is easily accomplished using one or more common analytical methods known to those of skill. Representative but nonlimiting examples of such methods include liquid chromatography, gas chromatography, and thin layer chromatography. Such techniques are readily employed in monitoring a reaction to form a 2ME Adduct of formula I or II or combinations of such compounds as described herein. It is a feature of the invention that the mixture components are easily blended and the reaction between the contacted components is easily monitored using conventional methods.

In embodiments, the reaction to form the 2ME Adduct of formula I is followed by transformation of $R^1$=H to $R^1$=sodium, lithium, potassium, or an ammonium. Stated differently, a carboxylic acid moiety of a 2ME Adduct of formula I may be transformed to the corresponding carboxylate salt. In embodiments a portion of the 2ME Adduct of formula I includes a mixture of species wherein $R^1$=H and $R^1$=sodium, lithium, potassium, or an ammonium. Such transformations are achieved using conventional methodology for neutralization or partial neutralization of carboxylic acids, which is well known to the skilled artisan. For example, addition of sodium hydroxide to a carboxylic acid in an aqueous environment will result in formation of a sodium carboxylate salt. In embodiments wherein $R^1$ is an ammonium, the ammonium is any cationic nitrogen moiety or mixture thereof, including but not limited to ammonium ($NH_4^+$), hydrocarbyl and functionalized hydrocarbyl ammonium groups including tetramethyl ammonium ($N(CH_3)_4^+$), tetraethylammonium (($N(CH_2CH_3)_4^+$), butyltrimethylammonium (($H_3C)_3N(CH_2CH_2CH_2CH_3)^+$), and methyltriethanolammonium ($H_3CN(CH_2CH_2OH)_3^+$). In embodiments the 2ME Adducts of formula I comprise a mixture of two or more of the foregoing.

In embodiments, the reaction to form the 2ME Adduct of formula II is followed by ring opening of the anhydride using water under acidic or basic conditions, resulting in two carboxylic acid or carboxylate salt groups per molecule of 2ME Adduct, depending on pH as will be appreciated by the skilled artisan.

In embodiments, after the reaction is complete, the 2ME Adduct of formulae I and/or II is employed without further purification as a corrosion inhibitor by applying the reaction product to one or more water sources to form a treated water source, and applying the treated water source to a metal containment. However, purification of the 2ME Adducts may be employed to remove solvent and/or unreacted components.

The 2ME Adducts are suitably stored neat, that is, substantially at 100% solids and without solvent or any other additives. When stored neat, the 2ME Adducts are storage stable for about one year, or about one year to five years, or about one year to ten years. However, to facilitate rapid mixing of the 2ME Adducts with a water source and further to facilitate pouring, pumping, or other manipulation of the 2ME Adduct as required to deliver it to a water source in need of corrosion inhibition, in embodiments the 2ME Adduct is formulated as a 2ME Adduct concentrate. The 2ME Adduct concentrates are suitably stored in standard storage conditions, followed by applying or adding the concentrate, often by pumping or pouring, to a water source comprising one or more corrodents.

Thus, in embodiments, the 2ME Adduct compositions are 2ME Adduct concentrates. A 2ME Adduct concentrate comprises or consists essentially of about 1 wt % to 90 wt % of one or more 2ME Adducts, and one or more solvents. Suitable solvents include water, $C_1$-$C_6$ alkanols, alkoxyalkanols, glycols, glycol ethers, and mixtures of two or more such solvents in any ratio. In some embodiments, the concentrate includes water as solvent and one or more nonionic surfactants, wherein the concentrate is an emulsion. The 2ME Adduct concentrates comprise or consist essentially of at least about 1 wt % and up to about 90 wt % of one or more compounds of formulae I and/or II, for example about 1 wt % to 80 wt %, or about 1 wt % to 70 wt %, or about 1 wt % to 60 wt %, or about 1 wt % to 50 wt %, or about 1 wt % to 40 wt %, or about 1 wt % to 30 wt %, or about 1 wt % to 20 wt %, or about 1 wt % to 10 wt %, or about 3 wt % to 90 wt %, or about 5 wt % to 90 wt %, or about 10 wt % to 90 wt %, or about 15 wt % to 90 wt %, or about 20 wt % to 90 wt %, or about 25 wt % to 90 wt %, or about 30 wt % to 90 wt %, or about 3 wt % to 30 wt %, or about 3 wt % to 20 wt %, or about 5 wt % to 25 wt %, or about 5 wt % to 15 wt % total 2ME Adduct content by weight of the concentrate. In embodiments the one or more solvents are the balance of the concentrate, that is, 10 wt % to 99 wt % of the 2ME Adduct concentrate. The 2ME Adduct concentrates are characterized as being liquid, or substantially liquid, at 20° C. In embodiments, the 2ME Adduct concentrates are characterized as being liquid, or substantially liquid, between 0° C. and 100° C. The 2ME Adduct concentrates are characterized as stable when stored in a container for a period of 24 hours to 5 years under standard storage conditions.

Solvents useful in forming and storing the 2ME Adduct concentrates under standard storage conditions are compounds that do not react with the 2ME Adduct to form any covalent bonds, and are themselves substantially liquid at temperatures at least in the range of −40° C. to 70° C. at atmospheric pressure. Solvents usefully employed in the 2ME Adduct concentrates include water, $C_1$-$C_6$ alkanols, alkoxyalkanols, glycols, glycol ethers, and mixtures of two or more such solvents in any ratio. In some embodiments, the reaction to form the 2ME Adduct of formulae I and/or II is facilitated by addition of one or more solvents, wherein the reaction product after contacting the components, and optionally after further heating the contacted components, is a 2ME Adduct concentrate. In some embodiments the 2ME Adduct concentrate is suitably applied to, added to, or contacted with a water source comprising one or more corrodents.

The 2ME Adduct concentrates are suitably stored within enclosed containers at temperatures of about −60° C. to 100° C., such as about −50° C. to 80° C., or about −40° C. to 70° C., or about −20° C. to 50° C., or about −10° C. to 50° C. for a storage period of about 1 day (24 hours) to 5 years, for example about 1 day to 2 years, or about 1 week to 2 years, or about 1 month to 2 years, or about 6 months to 2 years, or about 1 year to 2 years, or about 1 month to 1 year. During the storage, no special steps or treatments are required to stabilize or mitigate degradation within the 2ME Adduct concentrates.

In some embodiments, the reaction product or the 2ME Adduct concentrate is stored in a container for a period of about 24 hours to five years prior to applying the 2ME Adduct to a water source. During storage of the 2ME Adduct concentrates under standard storage conditions, $H_2S$ is not measurably released, as determined by storing the 2ME Adduct concentrates in containers under standard storage conditions, followed by headspace analysis of the storage containers for $H_2S$. It is an advantage of the 2ME Adducts of formulae I and/or II that they are easily dispersed or dissolved in one or more solvents to form a 2ME Adduct concentrate. It is an advantage of the 2ME Adducts of formulae I and/or II that the 2ME Adduct concentrates thereof are stable under standard storage conditions for at least 24 hours and up to five years.

Optionally, the 2ME Adduct concentrates further include one or more additives. In embodiments the additives are one or more polymers, one or more surfactants, or combinations of two or more of these. In embodiments, the additives are added to the 2ME Adduct concentrate to provide a benefit to a water source, a treated metal containment, or both. Non-limiting examples of such benefits include stabilization against phase separation; pH adjustment; and ease and completeness of mixing when the 2ME Adduct concentrate is combined with the water source.

Suitable additives include alicyclic, aromatic, or aralkyl amines having 6 to 30 carbons, and including e.g. triazine, pyridine and substituted pyridines; aliphatic and alicyclic amides; imidazoline; quaternary ammonium surfactants having an HLB greater than about 9; phosphate esters such as $C_2$-$C_{16}$ or $C_8$-$C_{10}$ alkyl phosphate esters including e.g. di-2-ethylhexyl phosphate (di-2-ethylhexyl phosphoric acid), dinonylphosphate, didecylphosphate, mixed phosphate esters, and the like, ethoxylated $C_1$-$C_{12}$ or $C_8$-$C_{10}$ alkylphenol phosphate esters, or other organophosphate esters having a total of 2 to 30 carbons; quinoline, salts thereof, and quaternized derivatives thereof with $C_1$-$C_{30}$ alkyl halides; water soluble polymers such as polyethylene oxide and copolymers thereof; derivatives of carboxylic acids having 6 to 30 carbons, such as salts or alkanol esters of $C_1$-$C_{30}$ organic acids; and mono- or polyunsaturated long-chain acids derived from sources comprising, consisting essentially of, or consisting of TOFA, coconut oil, canola oil, palm seed oil, and the like obtained as a by-product of the Kraft process of wood pulp manufacture, principally from pulping coniferous trees. Blends of two or more of the foregoing additives are also suitably employed in the 2ME Adduct concentrates.

Each additive and amount of the additive is selected individually by a user for addition to the 2ME Adduct concentrate; the amounts of such additives are not particularly limited. However, in embodiments, a selected additive is present in the 2ME Adduct concentrate in an amount of 10 wt % or less based on the weight of 2ME Adduct present in the 2ME Adduct concentrate. For example, an additive is present in the 2ME Adduct concentrate in an amount of about 10 wt % to 0.0001 wt % based on the total weight of 2ME Adduct, or about 10 wt % to 0.001 wt %, or about 10 wt % to 0.01 wt %, or about 10 wt % to 0.1 wt %, or about 10 wt % to 1 wt %, or about 0.001 wt % to 5 wt %, or about 0.001 wt % to 4 wt %, or about 0.001 wt % to 3 wt %, or about 0.001 wt % to 2 wt %, or about 0.001 wt % to 1 wt % based on the total weight of 2ME Adduct present in the 2ME Adduct concentrate. The amount of additive is selected by the user to obtain optimized storage stability of the 2ME Adduct concentrate, optimized mixing of the 2ME Adduct concentrate with a water source, optimized performance of the 2ME Adduct in terms of corrosion inhibition, mixing, stability, or another factor or combination of two or more such factors.

Accordingly, disclosed herein is a method of storing a 2ME Adduct composition, the method comprising combining one or more 2ME Adducts of formulae I and/or II with one or more solvents to form a 2ME Adduct concentrate, optionally adding 10 wt % to 0.0001 wt % of one or more additives to the 2ME Adduct concentrate, and storing the 2ME Adduct concentrate in an enclosed container for at least 24 hours and as long as five years. In some embodiments the storing is between −40° C. and 70° C. During the storing of the 2ME Adduct concentrates under standard storage conditions, $H_2S$ is not measurably released, as determined by headspace analysis of the storage containers during the storage period.

In embodiments, the storage period is about 1 day to 5 years, or about 5 days to 5 years, or about 7 days to 5 years, or about 15 days to 5 years, or about 30 days to 5 years, or about 60 days to 5 years, or about 90 days to 5 years, or about 180 days to 5 years, or about 1 year to 5 years, or about 1 day to 2 years, or about 5 days to 2 years, or about 7 days to 2 years, or about 15 days to 2 years, or about 30 days to 2 years, or about 60 days to 2 years, or about 90 days to 2 years, or about 180 days to 2 years, or about 1 year to 2 years.

In embodiments, the container employed to store the 2ME Adduct concentrate is a discrete article having an interior volume and means to enclose a liquid therein, wherein "enclose" means substantially isolate the liquid from the ambient atmosphere and from fluid communication. In embodiments, the container includes one or more caps, valves, lids, covers, plugs, stoppers, doors, or other means known to those of skill to enable enclosing a liquid within the interior volume and also to enable subsequent removal of some or all of the liquid enclosed therein. In embodiments, the interior volume of the container enclosing the liquid includes a headspace volume comprising air.

The container used to enclose the 2ME Adduct concentrate is not particularly limited in terms of materials, shape, or size and is selected by the user for convenience of storing the container during a storage period. In various embodiments the concentrates are stored within a container comprising one or more materials that are stable to aqueous solutions; such materials include but are not limited to glass, metals, a polyamide, polyethylene terephthalate (PET), a polystyrene, an acrylonitrile-butadiene-styrene (ABS) terpolymer, or a polyolefin such as polyethylene, polypropylene, and copolymers thereof including copolymers with α-olefins such as octene and hexene. The containers are suitably formatted for the convenience of the user and in embodiments include bottles, jars, carboys, tanks, railroad cars, drums, and the like. The containers generally include means to periodically and temporarily open the otherwise enclosed container; such means include but are not limited to screw caps, valves, snap caps, fitted corks, fitted lids secured by pressure from e.g. clamps, clips, brackets; and the like.

Containers useful for storing the 2ME Adduct concentrates are substantially enclosed: that is, the container is substantially isolated from the atmosphere, aside from brief periods of opening the container to remove a portion of the contents thereof. Substantial isolation means that the container is isolated from the atmosphere during the storage period but may be periodically and temporarily opened during the storage period, for example to remove an aliquot of the composition for application to a water source within a metal containment. It is a feature of the 2ME Adduct concentrates that no $H_2S$ is detectible in the headspace of such containers during the storage period, when the detection is carried out using common techniques such as DRAEGER-TUBES® or GASTEC® tubes for headspace measurements. The enclosed containers containing the 2ME Adduct concentrates are suitably opened periodically and temporarily throughout the storage period, wherein no $H_2S$ is detected in the headspace above the stabilized concentrate during any one or more such openings. Thus, the enclosed storage containers may be defined as "substantially enclosed containers" wherein "substantially" indicates that the containers containing the stabilized concentrates are enclosed during the storage period but are suitably opened periodically and temporarily throughout the storage period.

One or more 2ME Adducts of formulae I and/or II are suitably applied to one or more water sources comprising one or more corrodents to form one or more treated water sources. A treated water source is contacted with a metal containment, wherein corrosion of a surface of the metal containment by the one or more corrodents present in the water source is inhibited. At any point in the storage, conveyance, treatment, discharge, disposal, or any other process in which a water source is contacted with a metal containment surface, about 0.5 ppm to 500 ppm of a 2ME Adduct of formulae I and/or II is advantageously applied to the water source to inhibit corrosion of the metal containment surface. The amount applied to the water source is based on either weight or volume, depending on the convenience of the user and the form of the 2ME Adduct composition employed (neat, concentrate) to apply to the water source.

Thus, also disclosed herein is a method of treating a water source comprising one or more corrodents, the method comprising or consisting essentially of applying about 0.5 ppm to 500 ppm by weight or by volume of one or more 2ME Adducts of formulae I and/or II to the water source to form a treated water source, for example about 5 ppm to 500 ppm, or about 10 ppm to 500 ppm, or about 15 ppm to 500 ppm, or about 20 ppm to 500 ppm, or about 25 ppm to 500 ppm, or about 30 ppm to 500 ppm, or about 35 ppm to 500 ppm, or about 40 ppm to 500 ppm, or about 45 ppm to 500 ppm, or about 50 ppm to 500 ppm, or about 60 ppm to 500 ppm, or about 70 ppm to 500 ppm, or about 80 ppm to 500 ppm, or about 90 ppm to 500 ppm, or about 100 ppm to 500 ppm, or about 0.5 ppm to 400 ppm, or about 0.5 ppm to 300 ppm, or about 0.5 ppm to 200 ppm, or about 0.5 ppm to 100 ppm, or about 0.5 ppm to 90 ppm, or about 0.5 ppm to 80 ppm, or about 0.5 ppm to 70 ppm, or about 0.5 ppm to 60 ppm, or about 0.5 ppm to 50 ppm, or about 0.5 ppm to 40 ppm, or about 0.5 ppm to 30 ppm, or about 0.5 ppm to 25 ppm, or about 0.5 ppm to 20 ppm, or about 0.5 ppm to 15 ppm, or about 0.5 ppm to 10 ppm, or about 0.5 ppm to 5 ppm, or about 1 ppm to 100 ppm, or about 5 ppm to 75 ppm, or about 5 ppm to 50 ppm, or about 10 ppm to 50 ppm of one or more 2ME Adducts by weight or by volume to the treated water source.

Also disclosed herein is a method of treating a metal containment, the method comprising or consisting essentially of forming a treated water source; and applying the treated water source to the metal containment. The metal containment is a tank, pipe, or other apparatus having a metal surface in contact with a water source, or potentially in contact with a water source, wherein the water source includes one or more corrodents. In embodiments the one or more corrodents include one or more of hydrogen sulfide, carbon dioxide, oxygen, sodium chloride, calcium chloride, and sulfur dioxide. In embodiments the method includes forming a 2ME Adduct concentrate, then combining the concentrate with the water source. In some such embodiments, the method further includes forming a 2ME Adduct concentrate and storing the 2ME Adduct concentrate under standard storage conditions for between 24 hours and five years prior to the adding.

In embodiments, the water source is an industrial water source, such as a produced water. In embodiments, the water source is a wastewater from an industrial process. In embodiments the one or more corrodents include $H_2S$. In embodiments, the metal surface or portion thereof in contact with the water source includes a carbon steel. In embodiments, the metal surface or portion thereof in contact with the water source includes a stainless steel. In embodiments, the water source is a continuously flowing water source, such as produced water flowing from a subterranean reservoir and into or through a pipe or tank, or wastewater isolated from a continuous manufacturing process flowing into a wastewater treatment apparatus. In other embodiments, the water source is a batch, or plug, substantially disposed in a batchwise or static state within the metal containment.

Also disclosed herein is a treated water source comprising water, one or more corrodents, and about 0.5 ppm to 500 ppm by weight or by volume of one or more 2ME Adducts of formulae I and/or II. In embodiments, the treated water source is disposed within a metal containment and contacted with a surface thereof or portion of a surface thereof.

Also disclosed herein is a treated metal containment comprising a metal containment and a treated water source contacting at least a portion of a metal surface thereof. In embodiments the metal containment is enclosed. In other embodiments the metal containment is exposed to the environment, is in fluid communication with one or more other devices or metal containments, or both exposed to the environment and in fluid communication with one or more other devices or containments. The 2ME Adducts of formulae I and/or II inhibit corrosion of the metal surface or portion thereof of the metal containment contacted by the treated water source.

In embodiments, the containment surface in contact with the treated water source includes a carbon steel surface. In embodiments, the water source is a continuously flowing water source, such as produced water flowing from a subterranean reservoir and into or through a pipe or tank, or wastewater isolated from a continuous manufacturing process flowing into a wastewater treatment apparatus. In other embodiments, the water source is a batch, or plug, substantially disposed in a batchwise or static state within the containment.

In embodiments, the 2ME Adducts of formulae I and/or II inhibit corrosion of the metal surface more effectively than a conventional sulfur-based corrosion inhibitor. That is, the 2ME Adducts of formulae I and/or II are more effective, on a weight basis, at inhibiting corrosion than at least one of: 2-mercaptoethanol, thioglycolic acid, and sodium thiosulfate. In embodiments, the 2ME Adducts of formulae I and/or II inhibit corrosion of the metal surface as effectively as 2-mercaptoethanol, on a weight basis. In embodiments, the 2ME Adducts of formulae I and/or II inhibit corrosion of the metal surface more effectively than 2-mercaptoethanol. In embodiments, the 2ME Adducts of formulae I and/or II inhibit corrosion of the metal surface as effectively as thioglycolic acid, on a weight basis. In embodiments, the 2ME Adducts of formulae I and/or II inhibit corrosion of the metal surface more effectively than thioglycolic acid. In embodiments, the 2ME Adducts of formulae I and/or II inhibit corrosion of the metal surface as effectively as sodium thiosulfate, on a weight basis. In embodiments, the 2ME Adducts of formulae I and/or II inhibit corrosion of the metal surface more effectively than sodium thiosulfate.

The metal containment in need of corrosion inhibition is any type of containment comprising one or more metal surfaces for contacting a water source containing one or more corrodents. In some embodiments, the metal containment or a contact surface thereof comprises, consists of, or consists essentially of steel. In some embodiments, the steel comprises, consists of, or consists essentially of carbon steel. In some embodiments, the metal containment or a contact surface thereof comprises, consists of, or consists essentially of iron. In some embodiments, the metal containment or a contact surface thereof comprises or consists essentially of aluminum, zinc, chromium, manganese, nickel, tungsten, molybdenum, titanium, vanadium, cobalt, niobium, copper, or mixtures thereof.

In some embodiments, the metal containment or a contact surface thereof comprises or consists essentially of metal and one or more of boron, phosphorus, sulfur, silicon, oxygen, nitrogen, and/or mixtures thereof. In some embodiments, the metal containment comprises, consists of, or consists essentially of a pipe. In some embodiments, the pipe is coiled tubing. In some embodiments, the pipe has a device attached thereto, the device or a contact surface thereof comprising, consisting of, or consisting essentially of metal. In some embodiments the device is a pressure gauge, a flowmeter, a chemical sensor, or a pump. In some embodiments, the metal containment comprises, consists of, or consists essentially of a tank. In some embodiments, the tank is enclosed and thus the contents of the tank are not open to the atmosphere. In some embodiments, the contents of the enclosed tank are at a pressure that is higher than the ambient environmental air pressure. In some embodiments, the contents of the sealed tank are at a pressure that is lower than the ambient environmental air pressure external to the tank. In some embodiments, the tank is open to the air and the contents are at ambient environmental air pressure. In some embodiments, the tank has an inflow and/or an outflow pipe attached thereto. In some embodiments, the tank has a device attached thereto, such as a pump, flowmeter, chemical sensor, pressure gauge, or metal drill pipe. In some embodiments, the metal containment is a railroad tank car, also known as an "oil can" rail car. In some embodiments, the metal containment is a tank truck, sometimes known as a tanker.

Steel is an alloy comprising, consisting of, or consisting essentially of iron and carbon. Typically, the carbon content of steel is between 0.002% and 2.1% by weight. In some embodiments, the steel comprises between about 0.002% and 2.1% of carbon by weight. In some embodiments, the steel additionally comprises manganese, chromium, nickel, tungsten, molybdenum, boron, titanium, vanadium, cobalt, niobium, phosphorus, sulfur, silicon, oxygen, nitrogen, or copper, or mixtures thereof. In some embodiments, the steel comprises iron sulfide, ferrous oxide (iron (II) oxide), ferric oxide (iron (III) oxide), iron (II,III) oxide, hydrated iron oxides such as $Fe_2O_3 \cdot nH_2O$ where n is a number between 0.1 and 3, $Fe(OH)_3$, and/or $FeO(OH)$. In some embodiments, the steel is pre-corroded and contains, comprises, or has a surface coating comprising rust, oxide, hydroxide, oxide-hydroxide, sulfide, chloride, sulfate, nitrate, carbonate, sulfite, nitrite, phosphate, or mixtures thereof.

Carbon steel is steel in which the main alloying component is carbon, wherein the carbon steel comprises between about 0.1% to about 2.1% by weight of carbon. In one embodiment, the carbon steel comprises between 0.1% and 2.1% by weight of carbon. In one embodiment, the carbon steel comprises between 0.1% and 2.0% by weight of carbon. In one embodiment, the carbon steel comprises between 0.12% and 2.0% by weight of carbon. In one embodiment, the carbon steel comprises between 0.15% and 2.0% by weight of carbon. In one embodiment, the carbon steel comprises between 0.17% and 2.0% by weight of carbon. In one embodiment, the carbon steel comprises between 0.12% and 0.18% by weight of carbon. In one embodiment, the carbon steel comprises between 0.12% and 0.15% by weight of carbon. In one embodiment, the carbon steel comprises 0.18% by weight of carbon.

In embodiments, a method of inhibiting corrosion of a metal containment surface comprises or consists essentially of applying a 2ME Adduct or mixture thereof to one or more water sources to form a treated water source, and contacting the treated water source with a metal containment surface or portion thereof. In embodiments the applying is applying about 0.5 ppm to 500 ppm by weight or by volume of one or more 2ME Adducts to the water source to form a treated water source. In embodiments, the 2ME Adduct or mixture thereof is applied neat. In some such embodiments, the method further includes heating the neat 2ME Adduct or mixture thereof before the applying to the water source to form a treated water source. In embodiments, the 2ME Adduct or mixture thereof is provided neat and the method further includes dissolving or dispersing the 2ME Adduct or mixture thereof in water or water mixed with a water-miscible solvent before applying the 2ME Adduct or mixture thereof to the water source to form the treated water source. In embodiments, the 2ME Adduct or mixture thereof is provided as a 2ME Adduct concentrate. In embodiments the method includes applying an 2ME Adduct concentrate directly to a metal containment in an amount that results in 0.5 ppm to 500 ppm by weight or by volume of one or more 2ME Adducts in the water source. In other embodiments the method further includes diluting a 2ME Adduct concentrate prior to the applying. The diluting comprises, consists essentially of, or consists of combining a 2ME Adduct concentrate with a diluent, wherein the diluent comprises, consists essentially of, or consists of water, a water source, a water miscible solvent, or a mixture of two or more thereof; and optionally includes mixing the 2ME Adduct concentrate with the diluent.

In embodiments, the applying a 2ME Adduct to a water source comprises, consists essentially of, or consists of dripping, pouring, spraying, pumping, injecting, or otherwise adding a 2ME Adduct composition to the metal containment, or to a water source that subsequently contacts a metal surface or portion thereof in the metal containment. In some embodiments, the applying is batchwise; in other embodiments the applying is continuous. In some embodiments, the method of corrosion inhibition further comprises storing a 2ME Adduct concentrate in a container for a storage period before the applying. In such embodiments, the 2ME Adduct concentrate is characterized by a lack of $H_2S$ present in the headspace of the container after the storage period. In some embodiments the method of corrosion inhibition further comprises storing the 2ME Adduct in the absence of solvents or the substantial absence of solvents prior to the applying. In some such embodiments, the 2ME Adduct is heated to a temperature of about 30° C. to 100° C. prior to the applying, wherein the 2ME Adduct in the absence or substantial absence of solvents may soften or flow upon heating, thereby allowing its application to the metal containment, or to the water source that subsequently contacts a metal surface or portion thereof in the metal containment.

In embodiments, the water source is selected from the group consisting of produced water, injectate, effluent from mining, and effluent from paper production. In embodiments, the water source is a high total dissolved solids water source; a high temperature water source; or a high total dissolved solids, high temperature water source. As used herein, "high temperature" means temperature in excess of about 60° C. and as high as about 200° C. As used herein, "high total dissolved solids" means about 5 wt % or more non-polymeric solids are dissolved in the water source. In some embodiments where the water source includes high total dissolved solids, a substantial portion of the total dissolved solids (that is, more than 50% by weight) are ionic compounds. High total dissolved solids water sources include about 5 wt % to 35 wt %, or about 5 wt % to 32 wt %, or about 5 wt % to 30 wt %, or about 5 wt % to 28 wt %, or about 5 wt % to 26 wt %, or about 5 wt % to 24 wt %, or about 5 wt % to 22 wt %, or about 5 wt % to 20 wt %, or about 6 wt % to 35 wt %, or about 7 wt % to 35 wt %, or about 8 wt % to 35 wt %, or about 9 wt % to 35 wt %, or about 10 wt % to 35 wt %, or about 12 wt % to 35 wt %, or about 14 wt % to 35 wt %, or about 16 wt % to 35 wt %, or about 18 wt % to 35 wt %, or about 20 wt % to 35 wt %, or about 22 wt % to 35 wt %, or about 25 wt % to 35 wt %, or about 10 wt % to 32 wt %, or about 10 wt % to 30 wt %, or about 10 wt % to 28 wt %, or about 10 wt % to 26 wt %, or about 10 wt % to 24 wt %, or about 10 wt % to 22 wt %, or about 10 wt % to 20 wt % non-polymeric solids. In some embodiments, the non-polymeric solids are corrodents. In some embodiments, the non-polymeric solids comprise corrodents. In some embodiments, the water source is produced water, brackish water, or sea water.

In some embodiments, the water source comprises, consists essentially of, or consists of produced water, injectate, seawater, municipal water, wastewater such as runoff water, "gray" water, municipal waste water, treated or partially treated waste water, brackish water, sea water, connate, groundwater, wastewater discharge from a pulp or paper mill, waste from mining such as "tailings", red mud from aluminum mining and processing, yellow boy, acid mine drainage, or a combination of two or more such water sources as determined by context. In some embodiments, the water source comprises 85000 ppm Cl or more. In some embodiments, the water source comprises from 300 to 18000 ppm by weight of Cl. In some embodiments, the water source comprises between 10000 and 100000 ppm of Cl. In some embodiments, the water source comprises between 50000 and 200000 ppm based on weight.

In some embodiments, the water source comprises water and one or more corrodents, wherein the one or more corrodents comprises, consists essentially of, or consists of metal cations, metal complexes such as aqueous metal cations, metal chelates and/or organometallic complexes, aluminum ions, ammonium ions, barium ions, chromium ions, cobalt ions, cuprous ions, cupric ions, calcium ions, ferrous ions, ferric ions, hydrogen ions, magnesium ions, manganese ions, molybdenum ions, nickel ions, potassium ions, sodium ions, strontium ions, titanium ions, uranium ions, vanadium ions, zinc ions, bromide ions, carbonate ions, chlorate ions, chloride ions, chlorite ions, dithionate ions, fluoride ions, hypochlorite ions, iodide ions, nitrate ions, nitrite ions, oxide ions, perchlorate ions, peroxide ions, phosphate ions, phosphite ions, sulfate ions, sulfide ions, sulfite ions, hydrogen carbonate ions, hydrogen phosphate ions, hydrogen phosphite ions, hydrogen sulfate ions, hydrogen sulfite ions, carbonic acid, hydrochloric acid, nitric acid, sulfuric acid, nitrous acid, sulfurous acid, peroxy acids, phosphoric acid, ammonia, bromine, carbon dioxide, chlorine, chlorine dioxide, fluorine, hydrogen chloride, hydrogen sulfide, iodine, nitrogen dioxide, nitrogen monoxide, oxygen, ozone, sulfur dioxide, hydrogen peroxide, polysaccharide, or combinations thereof.

In some embodiments, the one or more corrodents comprises, consists of, or consists essentially of insoluble particulates such as metal oxides, sands, clays, silicon dioxide, titanium dioxide, muds, and other insoluble inorganic and/or organic particulates, which in some embodiments act as abrasives when entrained in a water flow contacting a metal.

In some embodiments, the one or more corrodents comprises, consists of, or consists essentially of an oxidizing agent. In some embodiments, the corrodent comprises, consists of, or consists essentially of a chelating agent. In some embodiments, the corrodent comprises an alcohol. In some embodiments, the corrodent comprises an organochlorine compound. In some embodiments, the one or more corrodents comprises, consists of, or consists essentially of an acid. In some embodiments, the one or more corrodents comprises, consists of, or consists essentially of an alkali.

In some embodiments, the pH of the water source is less than 7. In some embodiments, the pH of the water source is between about 1 and about 6. In some embodiments, the pH of the water source is between 5 and 6. In some embodiments, the pH of the water source is between 4 and 5. In some embodiments, the pH of the water source is between 3 and 4. In some embodiments, the pH of the water source is between 2 and 3. In some embodiments, the pH of the water source is between 1 and 2. In some embodiments, the pH of the water source is between 0 and 1. In some embodiments, the pH of the water source is between 7 and 14. In some embodiments, the pH of the water source is between 8 and 14. In some embodiments, the pH of the water source is between 9 and 14. In some embodiments, the pH of the water source is between 10 and 14. In some embodiments, the pH of the water source is between 11 and 14. In some embodiments, the pH of the water source is between 12 and 14. In some embodiments, the pH of the water source is between 13 and 14. In some embodiments, the pH of the water source is between 7 and 8. In some embodiments, the pH of the water source is between 7 and 9. In some embodiments, the pH of the water source is between 7 and 10. In some embodiments, the pH of the water source is between 7 and 11. In some embodiments, the pH of the water source is between 7 and 12. In some embodiments, the pH of the water source is between 7 and 13. In some embodiments, the pH of the water source is between 8 and 13. In some embodiments, the pH of the water source is between 9 and 12. In some embodiments, the pH of the water source is between 10 and 11.

In some embodiments, the water source comprises, consists essentially of, or consists of produced water; injectate; connate; industrial wastewater; an aqueous mixture comprising sodium hydroxide and sodium sulfide ("white liquor"); an aqueous mixture comprising lignin, one or more carbohydrates, sodium carbonate, sodium sulfate, and/or one or more other salts ("black liquor"); municipal waste water, treated or partially treated waste water; sea water; or a combination of two or more such water sources as determined by context. In some embodiments, the water source includes one or more salts, ions, buffers, acids, bases, surfactants, or other dissolved, dispersed, or emulsified compounds, materials, components, or combinations thereof. In some embodiments, a water source includes about 0 wt % to 35 wt % total dissolved solids. In some such embodiments, the total dissolved solids are substantially non-polymeric solids. In some such embodiments, the dissolved solids comprise, consist of, or consist essentially of ionic compounds. In some embodiments, the water source to which the corrosion inhibitor is applied to produce the corrosion inhibitor composition is sea water, brackish water, produced water, one or more additional water sources, or combinations thereof. In some such embodiments, the additional water source includes 300 ppm or more of one or more ions. In some embodiments, the water source for the corrosion inhibitor composition contains one more of the following: about 300 ppm or more of Ca, for example 500 ppm or more or even 3000 ppm or more of Ca; about 1100 ppm or more of Mg; about 300 ppm or more of Ba, for example about 500 ppm or more of Ba.

In some embodiments, the water source comprises, consists of, or consists essentially of brackish water. In some embodiments, the water source comprises, consists of, or consists essentially of seawater. In some embodiments, the water source comprises, consists of, or consists essentially of produced water. In some embodiments, the water source comprises 100 to 20000 ppm of Cl, based on weight. In some embodiments, the water source comprises 20000 to 25000 ppm of Cl, based on weight. In some embodiments, the water source comprises 10000 to 100000 ppm of Cl, based on weight. In some embodiments, the water source comprises 25000 to 200000 ppm of Cl, based on weight. In embodiments, the Cl is present as chloride ions. Useful water sources for the invention comprise, consist of, or consist essentially of produced water, injectate, or mixtures thereof.

In embodiments, the water source includes one or more salts, polymers, surfactants, scale inhibitors, stabilizers, metal chelating agents, corrosion inhibitors, paraffin inhibitors, and other additives as determined by the operator in a subterranean hydrocarbon recovery process or another industrial process. In some embodiments, the water source comprises, consists of, or consists essentially of injectate, connate, produced water, sea water, brackish water, or brine. In some embodiments, an injectate comprises one or more of connate, produced water, sea water, brackish water, or brine. In embodiments where an injectate comprises produced water, the injectate is also termed "recycled produced water." In some embodiments, the water source further comprises minor (<50 wt %) amounts of residual hydrocarbon products entrained therein and additionally. In some embodiments, produced water additionally comprises one or more surfactants, solvents, coupling agents, emulsifying agents (emulsifiers), demulsifying agents (demulsifiers), paraffin wax inhibitors, and mixtures of two or more thereof.

A water source comprising a sufficient concentration of corrodents such that the untreated water source corrodes carbon steel at a rate of about 500 milli-inches per year (mpy), exhibits a reduced rate of corrosion when 5 ppm by weight or by volume of a conventional sulfur-based corrosion inhibitor is applied thereto, for example a 50% reduction in corrosion rate (thus, to about 250 mpy) when 5 ppm of thioglycolic acid by volume is applied to a water source. However, a 2ME Adduct applied to the same water source at 5 ppm by volume results in greater than 50% reduction in the rate of corrosion, for example 55% to 98% reduction in the rate of corrosion, or about 60% to 98%, about 65% to 98%, about 70% to 98%, about 75% to 98%, about 80% to 98%, about 85% to 98%, about 90% to 98%, about 60% to 95%, about 60% to 90%, or about 60% to 85% reduction in the rate of corrosion. In embodiments, the reduced rate of corrosion of a carbon steel is a rate of less than about 250 mpy and in some embodiments as low as 10 mpy, such as 10 mpy to 200 mpy, 10 mpy to 150 mpy, 10 mpy to 140 mpy, 10 mpy to 130 mpy, 10 mpy to 120 mpy, 10 mpy to 110 mpy, 10 mpy to 100 mpy, 10 mpy to 90 mpy, 10 mpy to 80 mpy, 10 mpy to 70 mpy, 10 mpy to 60 mpy, 10 mpy to 50 mpy, or 10 mpy to 40 mpy. Such a result is unexpected to one of ordinary skill, because the 2ME Adducts of formulae I and/or II have less molar content of sulfur on a weight basis than conventional sulfur-based corrosion inhibitors such as thioglycolic acid, 2-mercaptoethanol, or sodium thiosulfate; consequently, one of skill would expect the 2ME Adducts to be less effective at inhibiting corrosion on a weight basis than thioglycolic acid, 2-mercaptoethanol, or sodium thiosulfate.

For example, when added to produced water at 5 ppm by volume, the 2ME Adduct compositions are more effective than thioglycolic acid at inhibiting corrosion of a carbon steel surface. In embodiments, the 2ME Adduct or mixture thereof reduces corrosion 100% to 500% more than the same weight of thioglycolic acid in the same water source and over the same period of time, for example about 100% to 400%, or about 100% to 300%, or about 100% to 200%, or about 100% to 500%, or about 100% to 400%, or about 100% to 300%, or about 100% to 200% more than the same weight of thioglycolic acid in the same water source and over the same period of time. In embodiments the period of time is at least 2 hours, at least 4 hours, or at least 8 hours. In embodiments the period of time is up to 10 years.

The experimental results below establish that the 2ME Adducts are more effective in inhibiting corrosion than conventional sulfur-based corrosion inhibitors, based on mass of corrosion inhibitor applied to a water source. Conventional sulfur-based corrosion inhibitors include 2-mercaptoethanol, thioglycol, and sodium thiosulfate. Further, since the 2ME Adduct compositions do not degrade to form $H_2S$, after a period of storage more corrosion inhibiting compound is present in a container including a 2ME Adduct concentrate than is present in a conventional sulfur-based corrosion inhibitor stored at the same concentration and for the same period of time and under the same storage conditions.

Even further, a 2ME Adduct may be stored neat, that is, in the absence or substantial absence of solvents. Neat storage reduces the volume required to store the 2ME Adduct compared to compositions including one or more solvents. In embodiments, the neat 2ME Adducts are stable under standard storage conditions. In embodiments, the neat 2ME Adducts are stable under non-standard storage conditions. In embodiments, the neat 2ME Adducts are stable under standard storage conditions but for longer periods of time than the same 2ME Adducts in a concentrate. For all these reasons the 2ME Adducts are more effective in inhibiting corrosion than conventional sulfur-based corrosion inhibitors including 2-mercaptoethanol, thioglycol, and/or sodium thiosulfate.

Having described the invention in detail, it will be apparent that modifications and variations are possible without departing from the scope of the invention defined in the appended claims.

EXPERIMENTAL

Example 1

A 1 liter roundbottom flask was charged with 156.4 g (2.0 mol) 2-mercaptoethanol, and the contents of the flask were warmed to 30° C.-35° C. Then 215.6 g (2.2 mol) maleic anhydride was slowly added to the flask with stirring. The reaction was observed to become exothermic. Heat was applied to the flask to maintain temperature of at least 100° C. while stirring was continued for another two hours. Then the heat source was disconnected and the contents of the flask, referred to as Adduct 1 herein, were allowed to cool to about 75° C. to 80° C.; Adduct 1 was observed to be transparent and flowable but highly viscous at this temperature. Adduct 1 was also found not to flow observably at temperatures below about 30° C. Adduct 1 was observed to dissolve in water at ambient laboratory temperature (between 17° C. and 23° C.). Then Adduct 1 was dissolved in methanol at 20 wt % form Concentrate 1.

Example 2

Adduct 1 was subjected to corrosion inhibition testing using corrosion bubble cell tests. The bubble cell tests were performed using the general procedure set forth in Andreev, N. et al., *J. Corros. Scale Inhib.* 2013, 2(1), 17-19. Conditions used were C1018 carbon steel electrode; 80° C.; $CO_2$ saturated 3% NaCl in water; continuous $CO_2$ sparge; and atmospheric pressure. The brine was allowed to contact the C1018 carbon steel electrode for about 3 hours; then the test was started by adding 5 ppm by volume of a test material (delivered from the 20 wt % solution in solvent) to the test vessel.

Corrosion inhibition results are expressed as milli-inches of steel lost (via corrosion) per year, or mpy, as a function of time. The test was carried out by applying an amount of Concentrate 1 to the brine in the test vessel to result in 5 ppm by volume of Adduct 1 in the brine. The test was repeated with 5 ppm by volume of thioglycolic acid (TGA), a conventional sulfur-containing corrosion inhibitor widely used in the industry. Finally, the test was repeated with no corrosion inhibitor added (Blank). FIG. 1 shows the comparison of corrosion rate of the Blank with brine containing 5 ppm Adduct 1 as well as the brine containing 5 ppm TGA.

FIG. 1 shows that the corrosion rate in the uninhibited test was reduced from about 250 mpy to about 30 mpy using Product 1; that is, Product 1 provided 88% corrosion inhibition. The corrosion rate in the test employing TGA was reduced from about 230 mpy to about 120 mpy; that is, TGA provided 48% corrosion inhibition.

Example 3

A 237 ml glass container containing about 40 g of neat Product 1 was sealed and equilibrated at a temperature of 50° C. The container was opened periodically and the headspace analyzed for presence of $H_2S$ using GASTEC® tubes. After 184 hours stored at 50° C., no $H_2S$ was detected in the headspace.

What is claimed:

1. A sulfur-functional corrosion inhibitor composition comprising a compound according to formula I and the compound according to formula II,

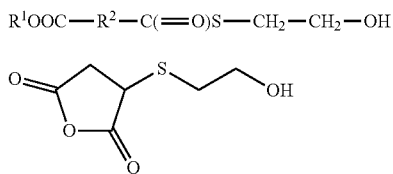

wherein $R^1$ is hydrogen, sodium, lithium, potassium, or an ammonium; and $R^2$ is CH=CH, $CH_2$—$CH_2$, or CH(S—$CH_2$—$CH_2$—OH)$CH_2$.

2. The composition of claim 1 further comprising a solvent.

3. The composition of claim 2 wherein the composition comprises about 10 wt. % to 99 wt. % of the solvent.

4. A treated water source comprising the sulfur-functional corrosion inhibitor composition and a produced water, the sulfur-functional corrosion inhibitor composition comprising a compound according to formula I, the compound according to formula II, or any combination thereof,

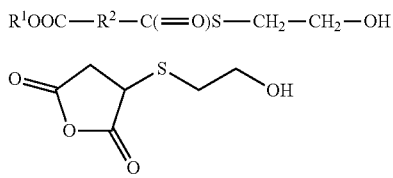

wherein $R^1$ is hydrogen, sodium, lithium, potassium, or an ammonium; and $R^2$ is CH=CH, $CH_2$—$CH_2$ or CH(S—$CH_2$—$CH_2$—OH)$CH_2$.

5. The treated water source of claim 4 wherein the treated water source comprises about 0.5 ppm to 500 ppm by weight of the sulfur-functional corrosion inhibitor composition.

6. The treated water source of claim 4 wherein the produced water comprises a corrodent comprising hydrogen sulfide, carbon dioxide, oxygen, sodium chloride, calcium chloride, or sulfur dioxide.

7. The treated water source of claim 6 wherein the produced water comprises $H_2S$.

8. A treated metal containment comprising: a metal containment comprising a metal surface; and the treated water source of claim 4 in contact with the metal surface or a portion thereof.

9. The treated metal containment of claim 8 wherein the metal containment is a tank or a pipe.

10. The treated metal containment of claim 8 wherein the metal surface comprises a carbon steel.

11. The treated metal containment of claim 8 wherein the rate of corrosion of the contacted metal surface is reduced when compared to the same metal surface contacted by the same water source wherein the sulfur-functional corrosion inhibitor composition is replaced by the same weight of thioglycolic acid.

12. A method of treating a metal containment, the method comprising:
a. applying a sulfur-functional corrosion inhibitor composition to a water source form a treated water source, the sulfur-functional corrosion inhibitor composition comprising: a compound according to formula I, the compound according to formula II, or any combination thereof

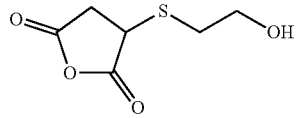

wherein $R^1$ is hydrogen, sodium, lithium, potassium, or an ammonium; and $R^2$ is CH=CH, $CH_2$—$CH_2$, or CH(S—$CH_2$—$CH_2$—OH)$CH_2$; and
b. contacting a metal surface of the metal containment with the treated water source.

13. The method of claim 12 wherein the applying consists essentially of applying the compound having formula II.

14. The method of claim 12 wherein the applying consists essentially of applying a compound having formula I.

15. The method of claim 12 wherein the applying is applying a total of about 0.5 ppm to 500 ppm by weight of the sulfur-functional corrosion inhibitor composition to the water source.

* * * * *